US012048278B1

(12) United States Patent
Edison-Strickling

(10) Patent No.: US 12,048,278 B1
(45) Date of Patent: Jul. 30, 2024

(54) GARDEN LID FOR AN INSTANT PLANTER

(71) Applicant: Ganeene Edison-Strickling, Indianapolis, IN (US)

(72) Inventor: Ganeene Edison-Strickling, Indianapolis, IN (US)

(*) Notice: Subject to any disclaimer, the term of this patent is extended or adjusted under 35 U.S.C. 154(b) by 93 days.

(21) Appl. No.: 18/060,172

(22) Filed: Nov. 30, 2022

(51) Int. Cl.
*A01G 9/02* (2018.01)
*A01G 13/02* (2006.01)

(52) U.S. Cl.
CPC .............. *A01G 9/02* (2013.01); *A01G 13/02* (2013.01)

(58) Field of Classification Search
CPC .... A01G 13/02; A01G 2009/003; A01G 9/02; A01G 13/0281
See application file for complete search history.

(56) References Cited

U.S. PATENT DOCUMENTS

| | | | |
|---|---|---|---|
| 4,791,754 A * | 12/1988 | Demars, Jr. | ............ A01G 13/04 47/29.2 |
| 6,223,466 B1 * | 5/2001 | Billings | ................... A01G 9/02 47/75 |
| 7,024,818 B2 | 4/2006 | Maniscalco et al. | |
| 9,572,309 B2 | 2/2017 | Russle et al. | |
| 10,492,390 B2 | 12/2019 | Paternostre et al. | |
| 2005/0166452 A1 * | 8/2005 | Felknor | ................ A01G 9/0291 47/73 |
| 2011/0308152 A1 * | 12/2011 | Harley | ................... A01G 25/00 47/48.5 |
| 2012/0227316 A1 * | 9/2012 | Ptak | ................... A01G 13/0243 47/65.5 |
| 2015/0319946 A1 | 11/2015 | Center | |

* cited by examiner

*Primary Examiner* — Daniel J Colilla

(57) ABSTRACT

An instant planter display lid for sizable planters wherein a potted plant can be immediately displayed directly on top. An apparatus for the display of indoor and outdoor, real and artificial, plants recessed into a larger planter without repotting. A quick, easy, money saving, material saving, lightweight, instantaneous planter pot accessory. A unit cover with a centrally located aperture and tapered downwards sidewalls having a slot to rest a potted plant whilst allowing for drainage. A sturdy support lid sloped towards the perimeter to diver liquid and having cap edge to secure over the lip of a planter.

2 Claims, 5 Drawing Sheets

GARDEN LID FOR AN INSTANT PLANTER

TECHNICAL FIELD

The present invention relates to planters, and more specifically to flower holders and the like.

BACKGROUND OF THE INVENTION

Prior art possibly relevant U.S. patents:
U.S. Pat. No. 9,572,309B2, Russell, Vogler, Thuma
U.S. Pat. No. 7,024,818B2, Maniscalco, Maniscalco, Whitlock
U.S. Ser. No. 10/492,390B2, Paternostre, Paternostre, Smit, Owens
US20150319946A1, Center Garden containers have become a great way to decorate homes and businesses. Garden containers are when plants are grown in pots instead of the ground. The use of garden containers has become popular for indoor use well as outdoor use. Gardens are versatile and may include plants, flowers, vegetables, fruit, herbs, and artificial arrangements. Personal taste and style have a wide spectrum therefore, creating a need to accommodate all styles of decor.

The use of plant containers has increased the variety of styles, shapes and sizes available. Garden centers, big box stores, and even hobby stores offer options of purchasing potted plants and the like. However, when sizable planters are the object of choice for a container garden an issue may arise. Going from a smaller potted plant container to a larger one usually requires repotting. Repotting involves extra time, effort and additional costs to achieve the end presentation. The results are usually achieved by tediously transplanting a potted plant into the desired vessel.

When transplanting plants additional supplies are needed such as garden tools, soil, and possibly plant food additives. The process can become messy with a need for protecting the ground or floor of the area involved. Once the time-consuming task is complete the mobility of the finished project may become difficult due to the weight of extra soil. Extra soil can also add considerable cost that individuals desire to limit.

Prior art U.S. Pat. No. 9,572,309B2 and U.S. Pat. No. 7,024,818B2 address using lifts and discs as false bottoms. Prior art U.S. Pat. No. 1,049,230B2 and US20150319946A1 address hydroponic smaller growing containers. Hydroponic plants are water based and the pots usually fit a maximum five-gallon bucket. To limit soil cost there have been a few approaches to this issue. Methods to address the amount of soil used has been to use fillers, insert lifts, insert discs, and hydroponic containers. They have been used to create a false bottom in larger containers to cut the cost and weight of extra needed soil. Fillers may include empty bottles, rocks, upside down nursery pots etc. These items may help fill the container cheaply while keeping its weightiness to a minimum. Fillers can result in uneven false bottoms making a market for insert lifts and insert discs to achieve a level false bottom. Hydroponic containers are less relevant as they use smaller individual growth mediums.

Plants can be categorized in many ways like life cycle and season for growth based on their geographic area. These stages do not require immediate transplantation after purchase. Also, repotting indoor and outdoor plants too soon can cause too much stress on the plant. House plants usually have a minimum of at least one year before there is a need to transplant. Outdoor plants can wait two to four months before transplanting is recommended. Before the need to transplant a plant occurs several factors may be considered. Individual and seasonal taste are taken into consideration for the longevity of a display. Seasonal or specific themes play a major part in the final desired display.

Decor has become precise to taste and invites a need for practicality based on lifestyles. Options for convenience and flexibility for displaying and changing displays of sizable planters have become relevant.

SUMMARY OF THE INVENTION

Accordingly, for one or more aspects a rigid lid placed on top of a sizable plant container to display real and artificial plants whilst effortlessly discarding the use of additional soil and fillers. A time saving and cost saving way to display plants in sizable containers without premature, messy repotting. A novel display lid to centrally hold potted plants securely recessed in a sizable planter while allowing for drainage and the diversion of excess liquid away from the potted plants. Other advantages of one or more aspects will be evident from a consideration of drawings, descriptions and embodiments.

DETAILED DESCRIPTION OF THE INVENTION

Figure 1:
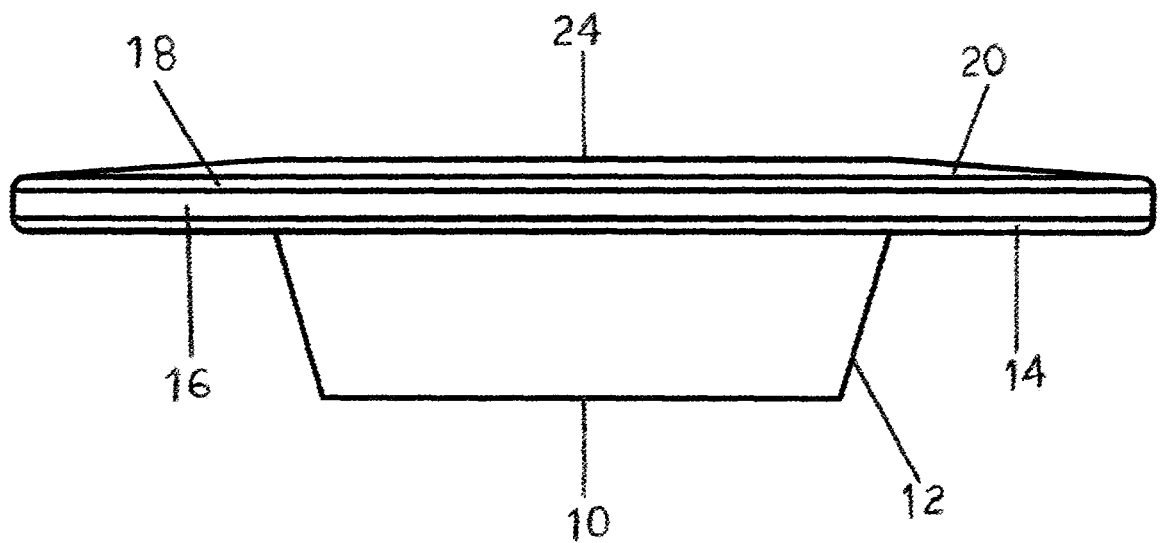
FIG. 1 is a side view in accordance with one embodiment of a garden lid.

FIG. 1 is a side view of a garden lid. A garden lid has a thin rimmed base 10 which is a uniform ledge. A ledge of the outside recess slot 12 is hollow allowing for plant drainage. Outside recess slot 12 is to rest potted plants extruded at a downward angle from underside of the outside collar 20. An outside collar 20 slants away from a centrally located hole 24 to keep excess water from pooling or overflowing the potted plant. An outside collar has a rimmed collar cap 16. A collar cap 16 has a top and bottom chamfer. Top cap 18 acts as a drip edge and a bottom cap 14 acts as a drip edge. The entire cap 14,16,18 rests over the edge of a container to stabilize the lid.

Figure 2:
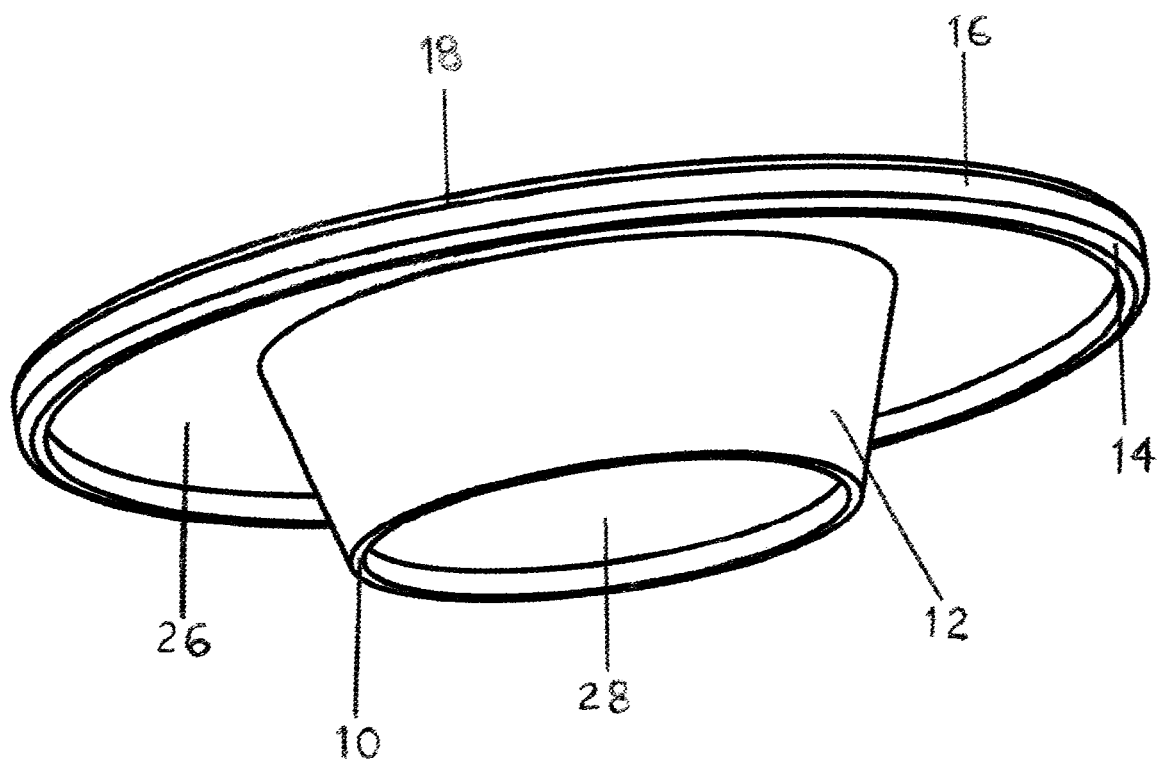
FIG. 2 is a bottom upward angle perspective view of the garden lid.

FIG. 2 is a bottom upward angle view. A garden lid has a thin rimmed base 10 connecting a tapered hollow cylinder shape. A hollow cylinder with a downward angle is an outside recess slot 12 with inner view inside recess slot 28. Angular cylinder allows the potted plant to rest securely even if it does not have a lip at the top. Open cylinder bottom allows for plant drainage. A tapered hollow cylinder is extruded centrally from the inside collar 26. The collar cap 16 has a top and bottom chamfer. Top cap 18 and a bottom cap 14 act as drip edges.

Figure 3:
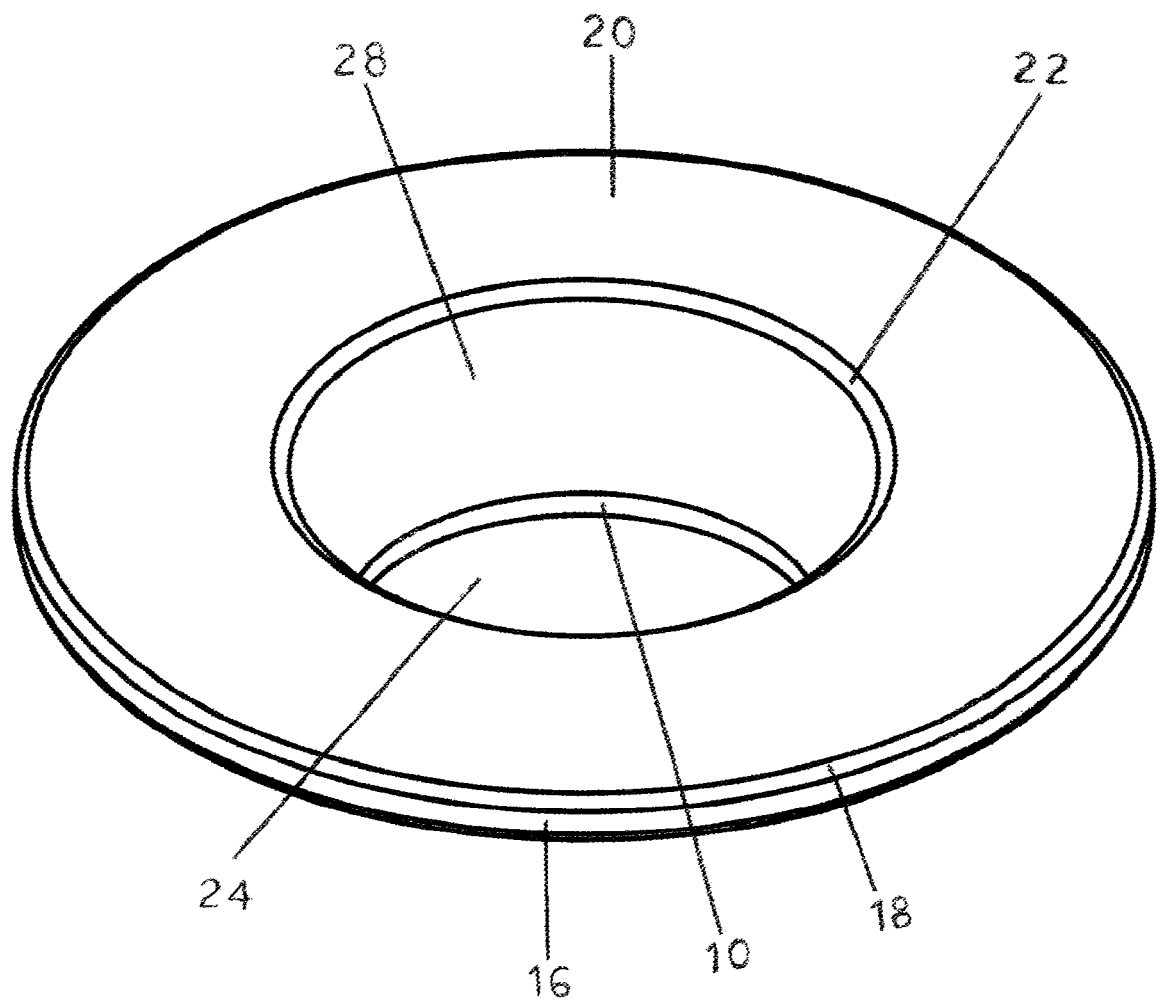
FIG. 3 is a top downward angle perspective view of the garden lid.

FIG. 3 is a top downward angle view. A garden lid has a thin rimmed base 10 and is below the sidewall of the inside recess slot 28. Inside recess slot 28 which has a beveled lead recess ledge 22 allows the potted plant lip, if present, to rest securely. A lead recess ledge 22 is flanked with the outside collar 20. Outside collar 20 has a collar cap 16 which has a chamfer edge. Chamfered edge top cap 18 acts as a drip edge for the slanted outside collar 20. A centrally located hole 24 in the inside recess slot 28 is for potted plants to rest and drain.

Figure 4:
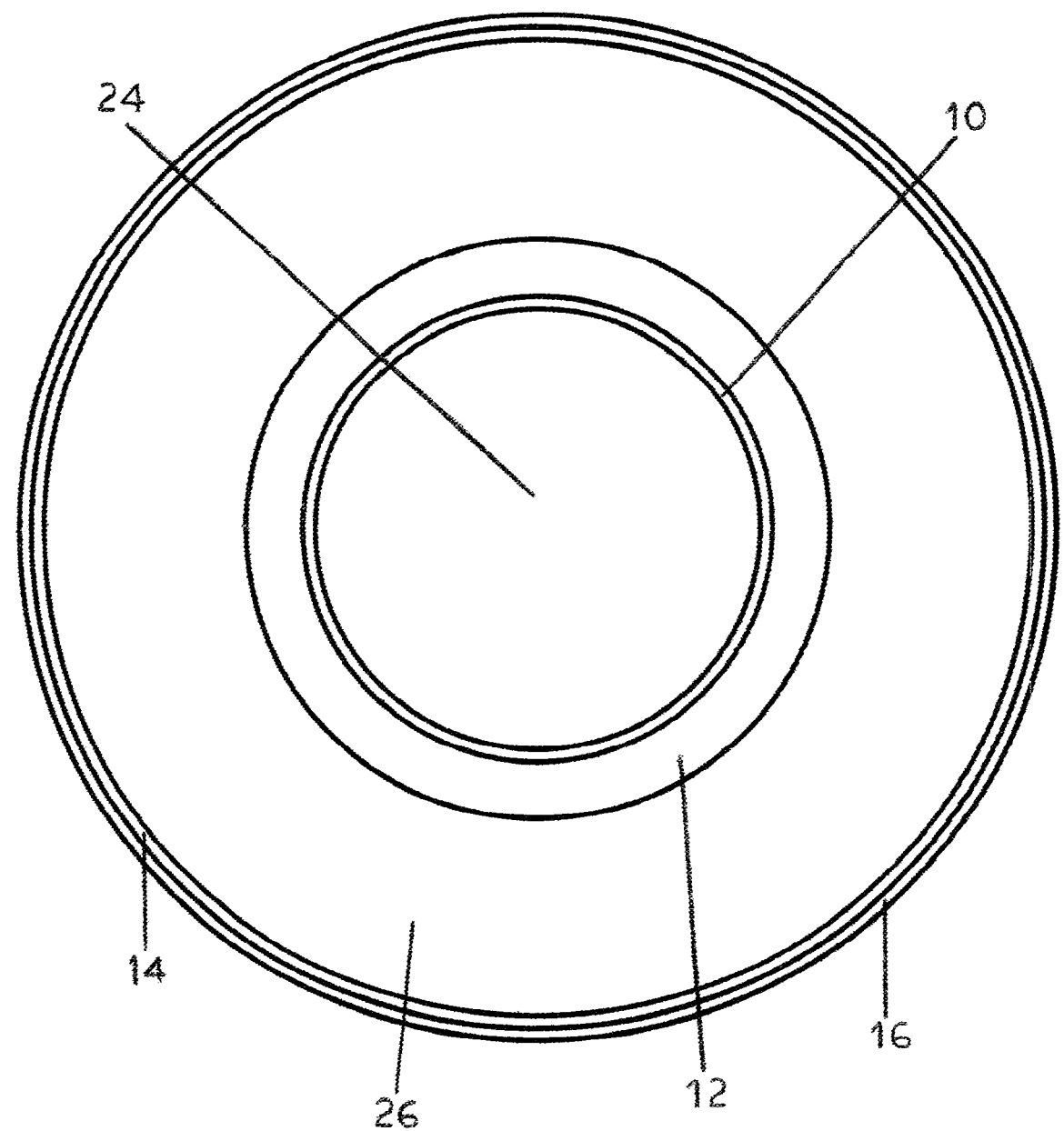
FIG. 4 is a bottom perspective view of the garden lid.

FIG. 4 is the bottom view. A garden lid has a hollow center hole 24 and a thin rimmed base 10. A hollow center allows for a plant to drain. Base 10 is connected to the outside recess slot 12. Outside recess slot allows the plant to rest and is attached to the inside collar 26. A inside collar 26 has a collar cap 16 with a chamfered bottom cap 14 for a drip edge.

Figure 5:
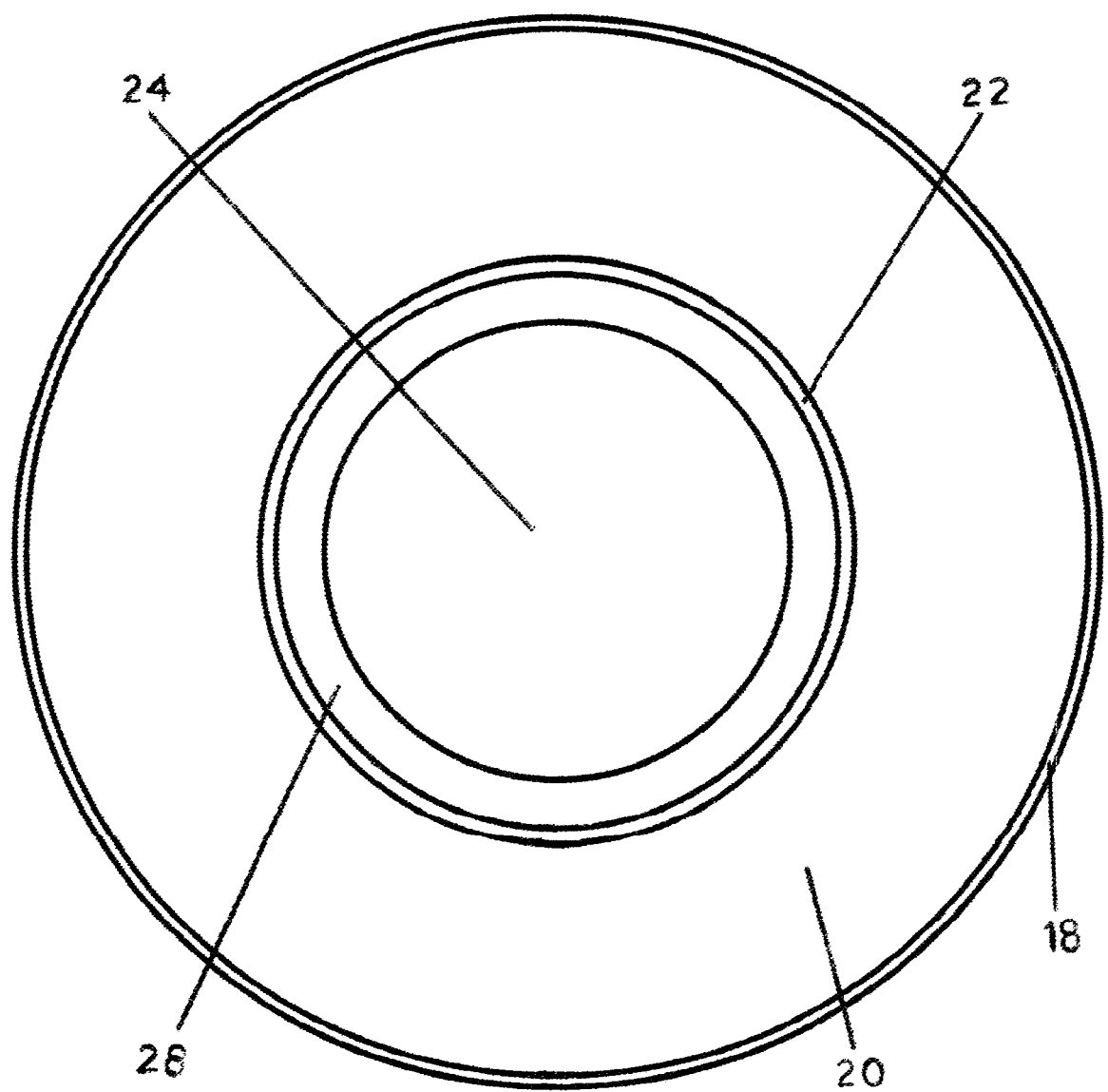
FIG. 5 is a top perspective view of the garden lid.

FIG. 5 is the top view. A garden lid has a hollow center hole 24 surrounded by a central sidewall. A sidewall inside recess slot 28 allows a plant to rest. A inside recess slot 28 is topped with a beveled lead recess ledge 22 which is flanked by the outside collar 20. An outside collar 20 slants to divert liquid from the center to a chamfer top cap 18 for a drip edge.

Operation FIGS. 1-5

Select a larger container for display and position it at desired location. Place appropriate size and shape garden lid on top that has minimal overhang of entire cap 14,16,18. Place selected potted plant into hole 24 gently press pot down until rim or lip meets lead recess ledge 22 and is snug in inside recess slot 28. Step back and enjoy the effortless display created.

Additional and Alternative Embodiments FIGS. 1-5

A garden lid shown circular, may have modified configurations with the same methodology to fit a container to be covered such as oblong, square, rectangle etc. Hence, permit various possibilities for additional shapes and sizes.

A garden lid entire cap 14,16,18 may be modified with straight or curved configurations.

A garden lid lead recess ledge 22 may be modified with straight or curved configurations.

The garden lid in drawings is depicted as one singular unit; however, it could be pieced out with more parts. Also, brackets, braces, bungies, hooks or the like could be added for additional support.

The garden lid may be constructed of any durable material to support potted plants. Some acceptable materials but not limited to are polyethylene, polypropylene, fiberglass, wood, metal, etc.

Color choices will be better determined by the choice of construction materials used and ease of manufacturing.

A garden lid could also have more than one downward angled slot for displaying plants.

Top-down finishes for a garden lid may be unlimited; smooth, laminated, textured to resemble mulch or rocks etc. For instance, indoor use may even be rhinestones or glitter surfaces to accommodate all tastes and styles. Cosmetic finishes add to the precise taste accommodations of the user.

The invention claimed is:

1. A method of displaying a real or artificial plant in a planter comprising the steps of:
    providing a planter;
    providing a lid for the planter, wherein the step of providing a lid includes:
    providing a circular outwardly sloping surface with a hole in a center of the surface;
    providing a tapered, hollow cylinder attached to the hole at a beveled lead recess ledge;
    providing a circular, vertical wall attached to an outer periphery of the circular outwardly sloping surface at a beveled edge;
    providing a bottom edge of the circular, vertical wall with an inwardly beveled edge;
    placing the lid on a top edge of the planter so that the circular, vertical wall overhangs the top edge of the planter;
    placing a selected, potted plant into the hole until a rim or lip of the potted plant meets the beveled lead recess ledge.

2. The method of displaying a real or artificial plant in a planter according to claim 1, wherein the lid is made of polyethylene.

\* \* \* \* \*